June 14, 1932.  E. E. MARQUART  1,862,602
COOKING UTENSIL
Filed July 11, 1931  3 Sheets-Sheet 1

Inventor
E. E. Marquart
By *Clarence A. O'Brien*
Attorney

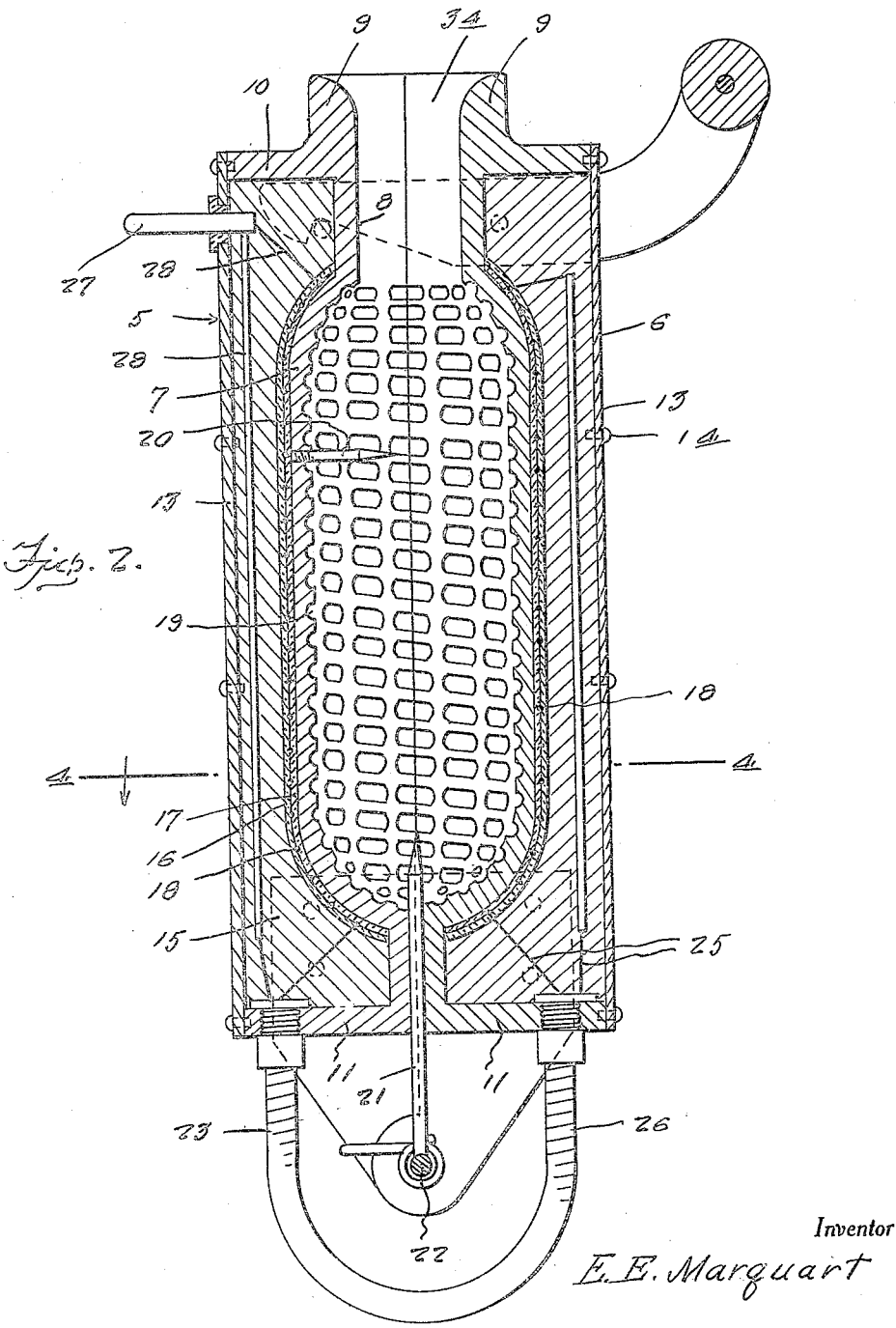

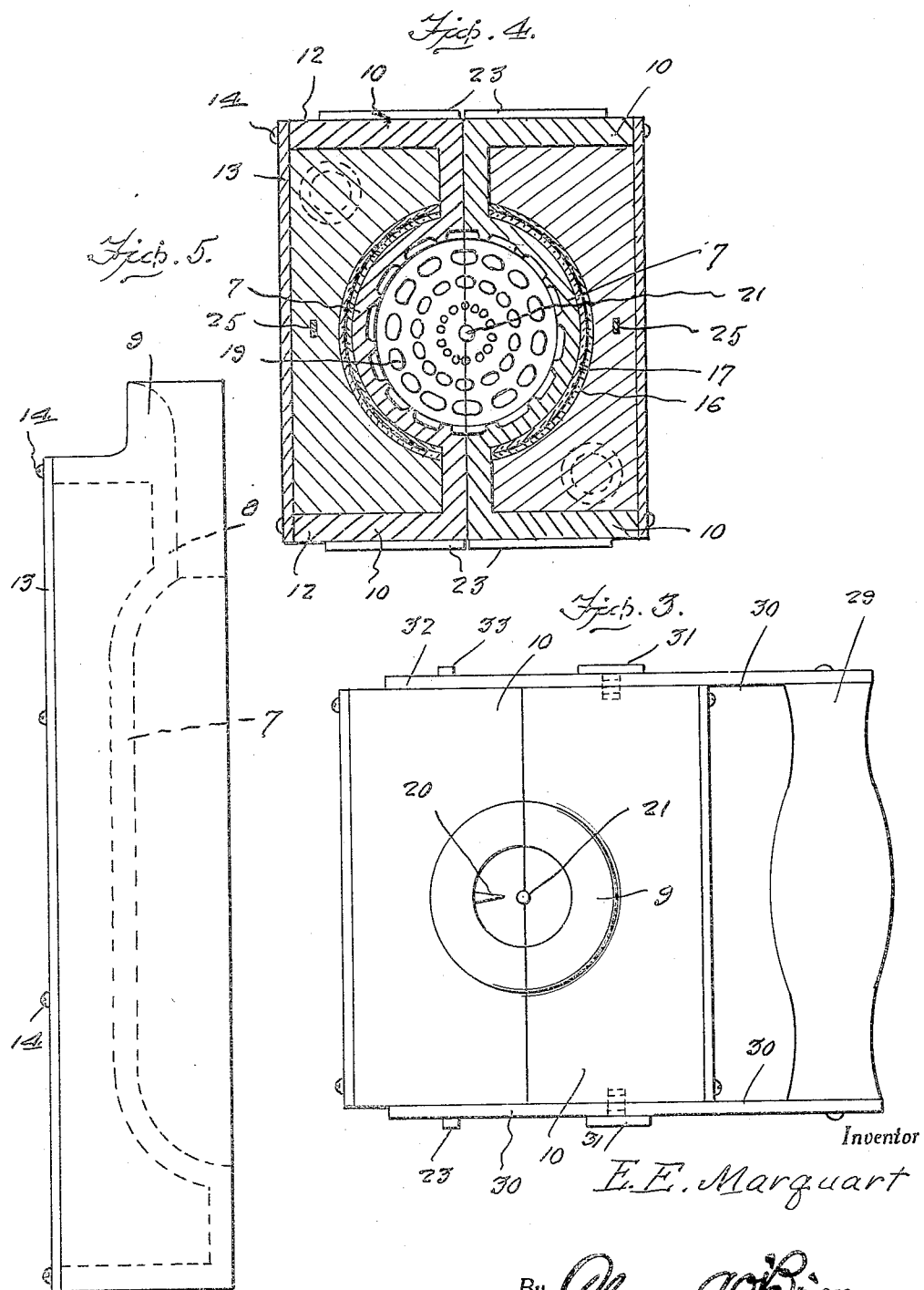

Patented June 14, 1932

1,862,602

UNITED STATES PATENT OFFICE

EDWIN E. MARQUART, OF FINDLAY, OHIO

COOKING UTENSIL

Application filed July 11, 1931. Serial No. 550,243.

This invention relates to new and useful improvements in cooking utensils, and more particularly to an electrical device for preparing meats and breads in combination form.

The principal object of this invention is to provide a cooking utensil in which a Frankfurter can be cooked with a surrounding jacket of bread or pastry.

Another important object of the invention is to provide a cooking utensil which can be easily and conveniently operated to secure perfect results in each manipulation.

These and other important objects and advantages of the invention will become apparent to the reader of the following specification and claims.

In the drawings:—

Fig. 2 represents a vertical sectional view taken substantially on the line 2—2 of Fig. 1.

Fig. 3 represents a top plan view of the device.

Fig. 4 represents a horizontal sectional view, taken substantially on the line 4—4 of Fig. 2.

Fig. 5 represents a side elevational view of one of the sections.

Figure 1:
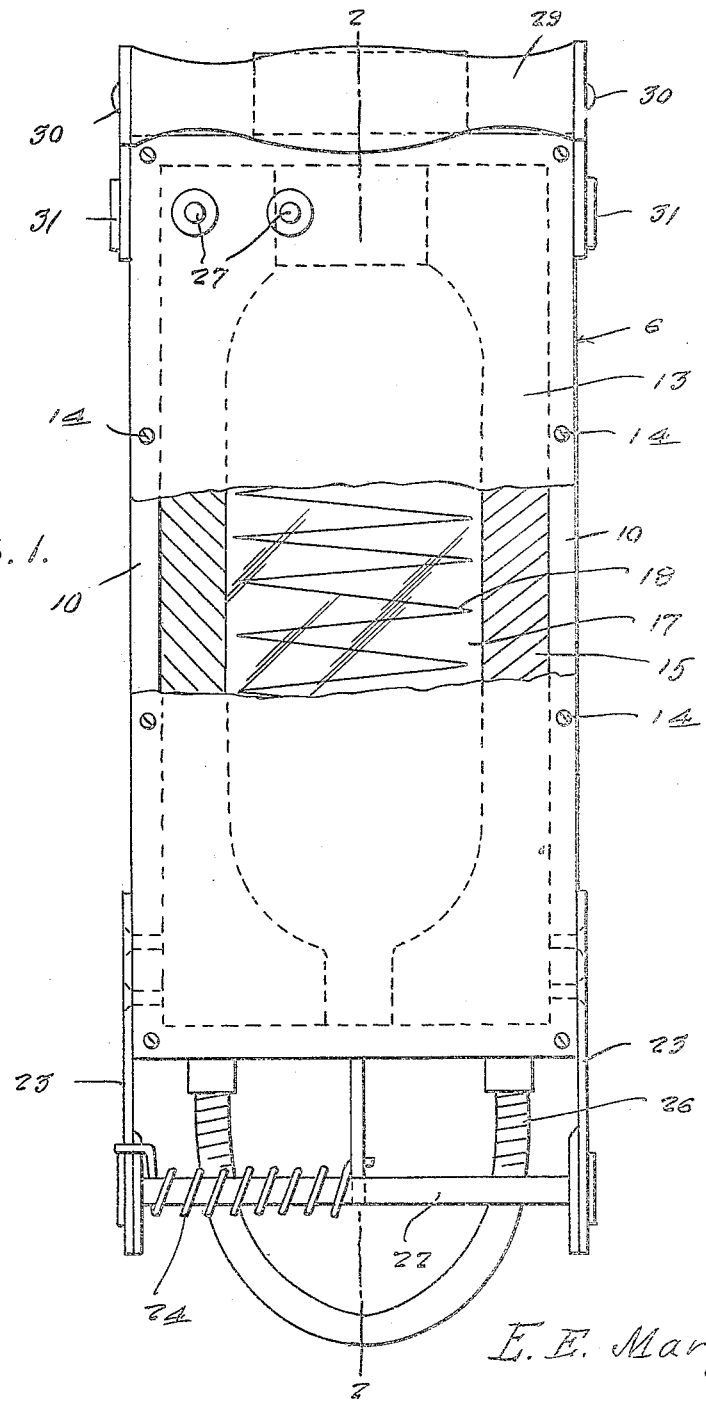
Figure 1 represents a front side elevational view partly in section.

Referring to the drawings wherein like numerals designate like parts, it can be seen that the utensil includes a pair of sections generally referred to by numerals 5—6. Each of these sections includes a mould 7 which is provided with a constricted neck portion 8 at one end of semi-circular shape in cross section, at the outer end of which is a semi-circular head portion 9 from which extends the rectangular shaped plate 10.

A corresponding plate 11 is provided at the lower end of the section and interposed between the ends of these plates 10—11 are the vertical side walls 12—12. The sides of the afore described shells or sections opposed to the mould 7 is open and can be normally closed by the plate 13 which has openings therein to accommodate the screws 14 which are threadable into the outer edge portions of the side walls 12—12.

Disposed into the shell of each section is a di-electric body 15. Interposed between this di-electric body 15 and the mould 7 are the sheets 16 and 17 of mica or some similar material between which the heating element 18 is interposed. The mould 7 of each section is provided with recesses 19 into which the batter from from which the bread or pastry jacket for the sausage is to be made, enters, and as shown in Fig. 2, a prong 20 extends from the mould 7 of the section 5, and onto this a Frankfurter can be perched after one end has been driven down over the upstanding prong 21, which extends upwardly from the pin 22.

This pin 22 extends through registering openings in the hinge sections 23, one of which is provided at each side of each of the sections 5—6. A spring 24 is convoluted on the pin 22 and is interposed between the prong 21 and one of the hinge sections 23, so as to normally maintain the prong 21 urged tensionally against section 5 to prevent accidental displacement of a Frankfurter when the sections are separated. The abutting portions of the lower end plates 11—11 are grooved to provide a passageway for the disposition of the aforementioned prong 21.

Extending from the electrical heating element 18 in the section 6 are the wires 25, which extend through the flexible conduit 26 between the sections 5—6, to connect with the prongs 27 on the upper portion of the section 5. The wires 28 extend from the heating element 18 on the section 5 to the same prongs 27 on the section 5.

Obviously, a conventional socket connector can be attached to the prongs 27 for furnishing electricity to the electrical heating elements.

A handle 29 has a laterally disposed curved arm 30 extending from each end thereof in the manner shown in Figs. 2 and 3. Each of these arms 30 is fulcrumed at its intermediate portion 31 to one side of the section 6, while its free end is provided with a hook 32 complementary to a pintle 33 on the corresponding side of the section 5.

Obviously, after a Frankfurter has been properly set upon the prong 21 and urged against the prong 20, the sections are brought together. The batter is now poured through the filler opening 34 formed by the heads 9—9. This batter runs into the moulds 7—7 and surrounds the Frankfurter to be cooked. When sufficient batter has been placed in the device, electricity is applied to the heating element.

After the food has cooked, the handle 29 is depressed, which removes the hook 33, thus permitting the sections to be spread apart for the removal of the cooked article.

While the foregoing specification sets forth the invention in specific terms, it is to be understood that numerous changes in the shape, size and materials may be resorted to without departing from the spirit and scope of the invention as claimed hereinafter.

Having thus described my invention, what I claim as new is:—

1. A cooking device of the character described comprising a pair of cooking mold sections, a pivot pin connecting the sections swingably together, and a pointed pin extending from the pivot pin with its pointed end projecting between the said mold sections.

2. A cooking device of the character described comprising a pair of mold sections, a pivot pin connecting the sections swingably together, and a pointed pin extending from the pivot pin and between the said mold sections with the mold sections clamping against the pointed pin when in closed position to set the pointed pin in a definite position between the mold sections.

3. A cooking device of the character described comprising a pair of mold sections, a pivot pin connecting the sections swingably together, and a pointed pin extending from the pivot pin and between the said mold sections with the mold sections clamping against the pointed pin when in closed position to set the pointed pin in a definite position between the mold sections, a coiled spring convoluting the said pivot pin, and having one end bearing against one of the mold sections and the other end bearing against the pointed pin.

4. A cooking device of the character described comprising a pair of cooking sections, a pointed pin projecting into the device and between the said sections, and spring means between the pin and one of the sections whereby the pin is tensionally urged against the said section.

In testimony whereof I affix my signature.

EDWIN E. MARQUART.